(12) United States Patent
Lausenhammer et al.

(10) Patent No.: US 6,245,278 B1
(45) Date of Patent: Jun. 12, 2001

(54) INJECTION NOZZLE AND METHOD

(75) Inventors: Manfred Lausenhammer, Konz; Arnold Mai, Irrel; Udo Schwarzkopf, Trierweiler-Udelfangen; Ralph Gauss, Luxembourg, all of (DE)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/325,070

(22) Filed: Jun. 3, 1999

(51) Int. Cl.$^7$ ..................................................... B29C 45/20
(52) U.S. Cl. .................. 264/328.1; 264/328.12; 264/328.14; 425/549; 425/568
(58) Field of Search .................. 264/323.1, 328.14, 264/328.15, 328.16, 328.12, 328.9; 425/549, 552, 562, 564, 567, 568

(56) References Cited

U.S. PATENT DOCUMENTS

| | | |
|---|---|---|
| 2,817,115 | * 12/1957 | Freifeld et al. . |
| 4,303,382 | * 12/1981 | Gellert . |
| 4,501,550 | 2/1985 | Nikkuni . |
| 4,711,602 | 12/1987 | Baker . |
| 4,965,028 | 10/1990 | Maus et al. . |
| 5,324,191 | * 6/1994 | Schmidt . |
| 5,513,976 | 5/1996 | McGrevy . |
| 5,545,028 | 8/1996 | Hume et al. . |
| 5,716,651 | 2/1998 | McGrevy . |
| 5,840,231 | * 11/1998 | Teng . |
| 5,871,786 | * 2/1999 | Hume et al. . |

FOREIGN PATENT DOCUMENTS 0546554   6/1993   (EP) .

* cited by examiner

Primary Examiner—Jill L. Heitbrink
(74) Attorney, Agent, or Firm—Bachman & LaPointe, P.C.

(57) ABSTRACT

The injection nozzle includes a longitudinal flow channel, a plurality of angular channels extending from the longitudinal flow channel (1) in a first direction at an acute angle with respect to the longitudinal axis of the nozzle, and (2) in a second direction at an acute angle with respect to the first direction, an annular channel extending from the angular channels, and a passageway extending from the annular channel to the injection orifice, wherein the angular channels cause a swirling action in the annular channel to flush out resin from the annular channel.

20 Claims, 3 Drawing Sheets

INJECTION NOZZLE AND METHOD

BACKGROUND OF THE INVENTION

The present invention relates to an injection nozzle and a method for injection molding, particularly hot runner nozzles and nozzle tips.

Hot runner nozzles, especially nozzle tips, typically contain hang up areas in their flow channels that make color or material changing of the resin problematic. Purging the new color material through the nozzle tip can be time consuming and wasteful of the resin. Heretofore, the only completely effective way to make a clean color change is to dismantle and clean the nozzle assembly to remove all traces of the previous color resin. Clearly, this can be very time consuming and expensive and risks damaging the equipment if the color changes are frequently made.

U.S. Pat. Nos. 5,513,976 and 5,716,651 to McGrevy and 5,545,028 to Hume et al. show a nozzle tip with an element that induces a spiral flow pattern in order to promote improved color changing. U.S. Pat. No. 4,965,028 to Maus et al. and U.S. Pat. No. 4,711,602 to Baker show nozzle tips with mixing elements to improve the homogeneity of the resin flowing through the nozzle tips. However, these references are not entirely effective in overcoming the foregoing problem and promoting rapid color changing.

European Patent Application 0 546 554 to Gellert, published Jun. 16, 1993 shows a nozzle tip containing a central element with spiral vanes that promote a swirling motion to the flow of infeeding resin; however, this also is not entirely effective.

U.S. Pat. No. 4,501,550 to Nikkuni shows a nozzle tip having a central infeed channel which diverges into multiple channels to feed past a central tip in order to improve inconveniences of color or material exchange. However, this does not promote flushing of the melt bubble in the narrow annular space underneath the nozzle support flange.

It would be desirable to provide a simple and effective nozzle tip design that conveniently promotes flushing out of the previous material to make efficient material and color changes possible.

Accordingly, it is a principal object of the present invention to provide an improved injection molding nozzle and method for injection molding.

It is a further object of the present invention to provide an improved nozzle and method as aforesaid including a simple and effective nozzle tip design that simply and effectively promotes flushing out of the previous material to make efficient material and color changes possible.

Further objects and advantages of the present invention will appear hereinbelow.

SUMMARY OF THE INVENTION

In accordance with the present invention, the foregoing objects and advantages are readily obtained.

The injection nozzle of the present invention comprises: a nozzle including a nozzle body portion communicating with a source of molten resin and a tip portion, including an injection orifice, for transferring molten resin to a mold cavity; wherein said nozzle has a longitudinal axis and at least one internal flow channel for transferring molten resin from said source of molten resin to said mold cavity; said internal flow channel including a longitudinal flow channel, at least one angular channel, and preferably a plurality of angular channels, extending from the longitudinal channel (1) in a first direction at an acute angle with respect to the longitudinal axis, and (2) in a second direction at an acute angle with respect to said first direction, an annular channel extending from the angular channel, and a passageway extending from the annular channel to the injection orifice; wherein said angular channel causes a swirling action in the annular channel to flush out resin from the annular channel.

The method of the present invention comprises: providing an injection nozzle including a nozzle body portion communicating with a source of molten resin and a tip portion, and including an injection orifice, for transferring molten resin to a mold cavity, wherein said nozzle has a longitudinal axis; transferring molten resin from said source of molten resin to said mold cavity via at least one internal flow channel in said injection nozzle, including the steps of transferring said molten resin via a longitudinal flow channel of said internal flow channel, at least one angular channel, and preferably a plurality of angular channels, of said internal flow channel extending from the longitudinal flow channel (1) in a first direction at an acute angle with respect to the longitudinal axis, and (2) in a second direction at an acute angle with respect to said first direction, an annular channel of said internal flow channel extending from the angular channel, and a passageway of said internal flow channel extending from the annular channel to the injection orifice; wherein the angular channel causes a swirling action in the annular channel to flush out resin from the annular channel.

Further features of the present invention will appear hereinbelow.

BRIEF DESCRIPTION OF THE DRAWINGS

The present invention will be more readily understandable from a consideration of the accompanying, illustrative drawings, wherein.

DETAILED DESCRIPTION OF PREFERRED EMBODIMENTS

Figure 1:
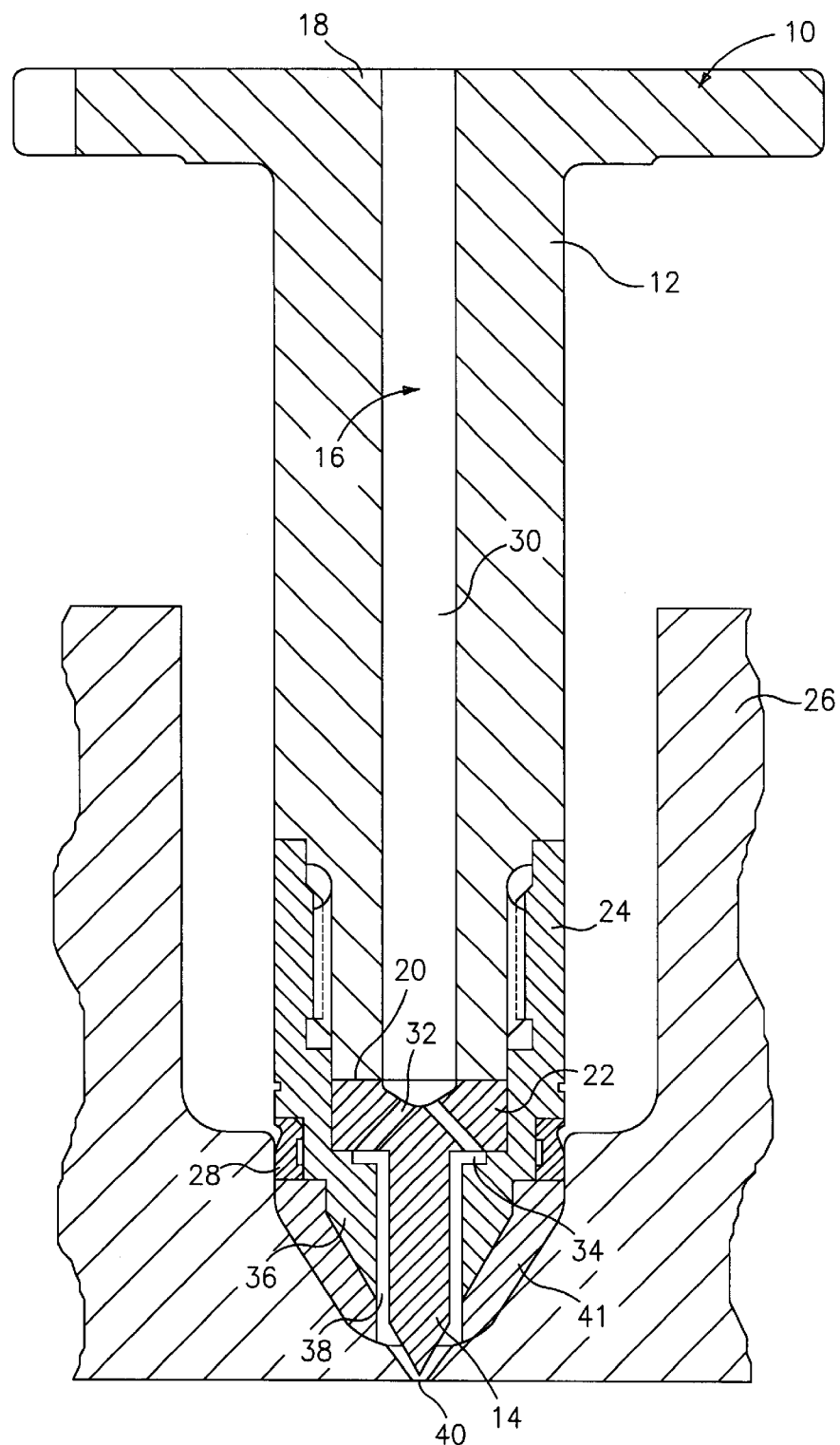
FIG. 1 is a cross-sectional view of one embodiment of the nozzle of the present invention.

Referring to the drawings and particularly to FIG. 1, injection nozzle 10 includes nozzle housing 12 and nozzle tip 14. Nozzle 10 includes internal flow channel 16 for transferring molten resin from a source of molten resin to a mold cavity. The source of molten resin and the mold cavity are conventional in the art and are not shown herein.

The nozzle housing 12 has an upstream end 18 and a downstream end 20. The nozzle tip 14 is a tip insert with a nozzle tip head 22 which is held and trapped between the downstream end 20 of the nozzle housing 12 and nozzle cap 24, with the nozzle cap 24 threaded onto nozzle housing 12. The nozzle housing is spaced from mold plate 26 by insulator ring 28 in a known fashion.

Internal flow channel 16 includes longitudinal flow channel 30 which extends from the upstream end 18 of the nozzle housing to the downstream end 20 of the nozzle housing. The longitudinal flow channel 30 is connected to at least one angular channel 32 and desirably is divided into a plurality of such angular flow channels and in the preferred embodiment from 6–8 of such angular flow channels. The collective cross-section of the angular channels is equal to or greater than that of the longitudinal flow channel in order to minimize any pressure drop that may be induced. The angular channels 32 direct the resin flow into annular channel 34 formed beneath nozzle tip insert head 22 and the inner portion of the downstream end 36 of nozzle cap 24. This causes the resin to desirably swirl around in annular channel 34 to flush out previous flowing resin and to facilitate rapid color change. The resin then flows from annular channel 34 via annular passageway 38 which surrounds nozzle tip insert 14 to injection orifice 40 and from the injection orifice to the mold cavity (not shown). Insulator ring 41 is provided adjacent downstream end 36 of nozzle cap in the bubble area of the injection nozzle.

Figure 2:
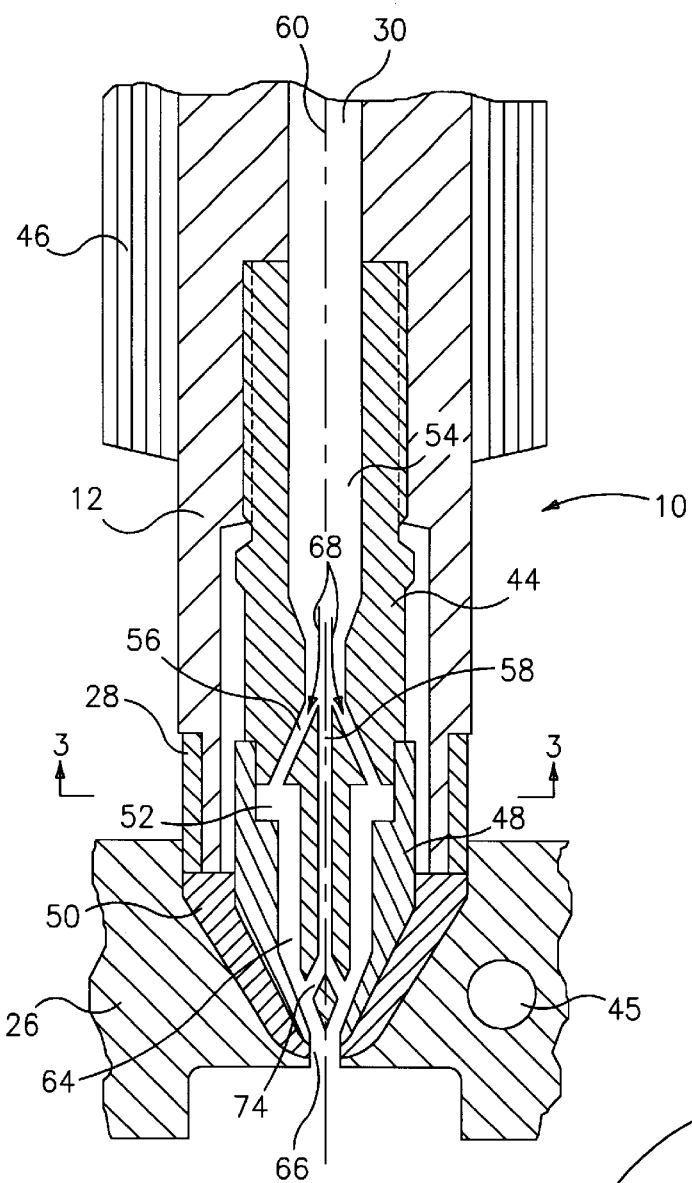
FIG. 2 is a cross-sectional view of a second embodiment of the present invention.
Figure 3:
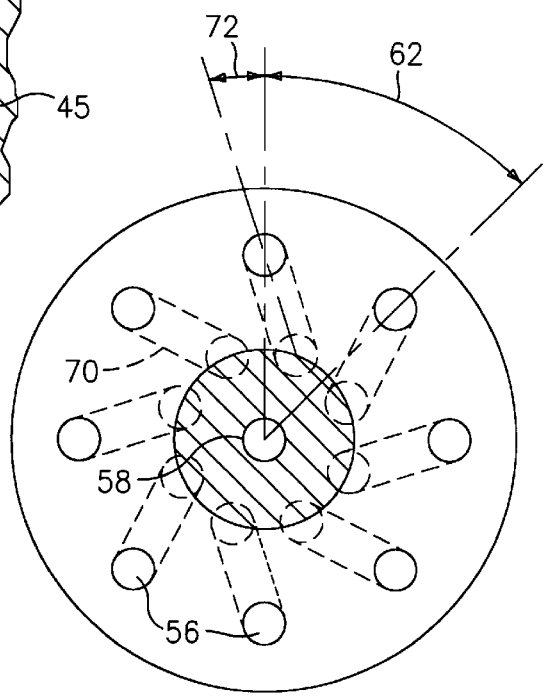
FIG. 3 is a cross-sectional view along lines 3—3 of FIG. 2.

FIGS. 2–3 show an alternate embodiment of the present invention. Referring to FIG. 2, nozzle housing 12 includes longitudinal flow channel 30 and nozzle tip 44 threaded onto the housing. Insulator ring 28 aligns and thermally insulates nozzle housing 12 from cooled mold plate 26, cooled via cooling channels 45. Heater 46 (not shown in FIG. 1) is provided on the nozzle housing. Nozzle cap 48 is pressed and brazed onto the nozzle tip and seals against mold plate 26 along insulator 50. The assembly of the nozzle cap 48 to the nozzle tip 44 creates annular mixing channel 52. Longitudinal flow channel 30 in nozzle housing 12 continues as central channel 54 in nozzle tip 44. The central channel 54 sub-divides into six to eight angular channels 56 (eight shown in FIGS. 2–3) and one downstream central channel 58. The angular channels 56 are circumferentially spaced around the longitudinal axis 60 of nozzle 10, with FIGS. 2–3 showing a circumferential spacing 62 of 45°. The angular channels 56 connect central channel 54 to annular channel 52. Thereafter the melt flows down annular passageway 64 towards injection orifice 66. Downstream central channel 58 feeds into annular passageway 64 adjacent injection orifice 66.

The angular channels 56 extend in a first direction 68 at an acute angle with respect to longitudinal axis 60, preferably from 10–30° with respect to the longitudinal axis as clearly shown in FIG. 2. In addition, the angular channels 56 extend in a second direction 70 at an acute angle with respect to the first direction as shown in phantom in FIG. 3. The second acute angle 72 is desirably from 10–30° with respect to the first angle. The result is to skew or twist the angular channels and to promote a rotary flow of incoming melt in annular mixing channel 52, thereby assisting in flushing melt out of the annular mixing channel.

Downstream central channel 58 along the center of nozzle tip 44 preferably sub-divides into a plurality of downstream angled channels 74, as for example 2–5 and preferably 3 of said downstream angled channels. The downstream angled channels 74 may if desired be skewed or twisted as angular channels 56, but in the preferred embodiment of FIGS. 2–3 they are not. Since all of the angled channels are machined in one piece in the injection nozzle 10 and they discharge into annular melt channels 52 and 64, there is no need for radial alignment of nozzle cap 48 to the nozzle housing 12 during assembly, thereby simplifying construction.

Typically, the nozzle tip is constructed of a good thermally conductive material like beryllium copper or steel, when abrasive resins are being processed, and the cap is typically made from a thermally insulative material.

In operation, when a color change or a different resin material is to be used, the cooling to the mold plate area is reduced by turning off cooling channel 45 and at the same time increasing heater 46. This causes the frozen melt film lining the melt channels in the tip and cap, namely for example the surfaces of annular mixing channel 52, annular passageway 64 and injection orifice 66, to soften and aid in flushing out into the mold cavity during the next few molding cycles, particularly in combination with the features of the present invention. As the next resin, as a different colored resin, is fed through the system, the cooling channel 45 is turned on to its former processing level and heater 46 is decreased to its former operating level. This causes the new resin to solidify as on the surfaces of channels 52, 64 and 66, thereby forming a skin covering the previously molded color skin that may still remain attached to said surfaces. In effect, the new skin prevents material from the former skin from mixing into the melt stream of the current resin and color being molded. This operational sequence of first turning off mold cooling and increasing nozzle temperature prior to a resin and/or color change and then restoring them to normal conditions after the new resin is introduced is highly advantageous and is known in the art. Moreover, it is particularly effective when used in the context of the present invention.

Therefore, the present invention enables the use of a nozzle assembly which effects a resin and/or color change within a few molding cycles without contamination and does so simply and effectively, thereby significantly reducing the amount of resin needed to flush the former resin or color from the system, as well as reducing cost, inconvenience and processing time.

Figure 4:
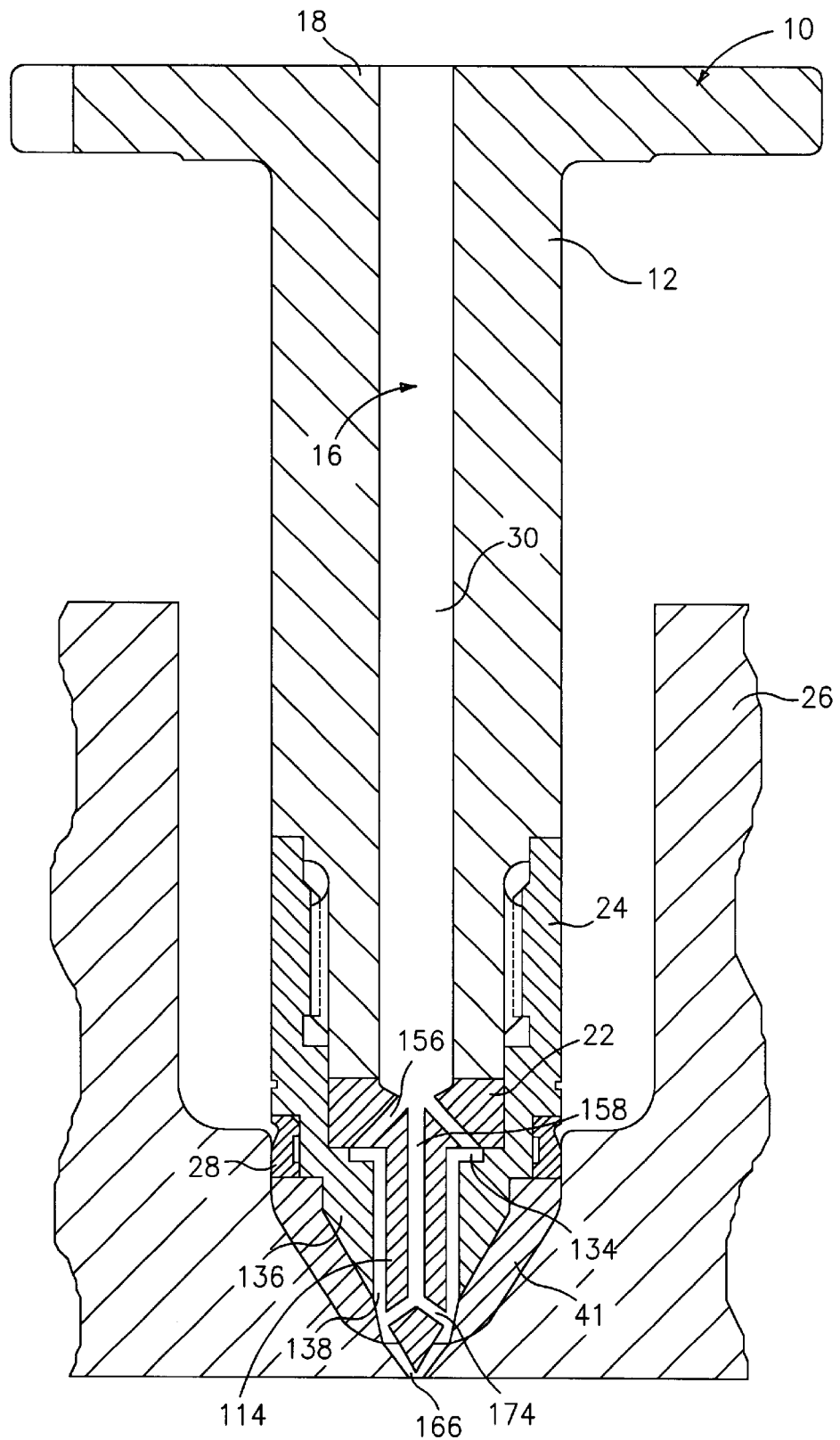
FIG. 4 is a cross-sectional view of a third and preferred embodiment of the present invention.

FIG. 4 shows a preferred embodiment of the present invention which is a combination of the features of FIGS. 1 and 2, with like numerals representing like components. As shown in FIG. 4, longitudinal flow channel 30 in nozzle housing 12 sub-divides into six to eight angular channels 156 as in FIG. 2. The angular channels connect longitudinal channel 30 to annular channel 134. Thereafter the melt flows down annular passageway 138 towards injection orifice 166. Downstream central channel 158 along the center of nozzle tip 114 preferably sub-divides into a plurality of downstream angled channels 174 as in FIG. 2 which discharge into annular passageway 138. In accordance with the embodiment of FIG. 4, nozzle cap 24 is threaded onto nozzle housing 12, with the nozzle tip 114 held between the nozzle housing and nozzle cap. On the other hand, FIG. 2 shows the nozzle cap 48 brazed onto the nozzle tip 44 which in turn is threaded into the nozzle housing 12.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. The method which comprises:
   providing an injection nozzle including a nozzle body or housing portion communicating with a source of molten resin and a tip portion, and including an injection orifice, for transferring molten resin to a mold cavity, said injection nozzle having a longitudinal axis;
   transferring molten resin from said source of molten resin to said mold cavity via at least one internal flow channel in said injection nozzle, including the steps of transferring said molten resin via
   a longitudinal flow channel of said internal flow channel,
   a plurality of angular channels of said internal flow channel each of which extending from the longitudinal flow channel (1) in a first direction at a first acute angle with respect to the longitudinal axis, and (2) in a second direction at a second acute angle with respect to the first direction, an annular channel of said internal flow channel extending from the angular channels, and a passageway of said internal flow channel extending from the annular channel;

including the step of transferring said molten resin via said longitudinal flow channel in the nozzle housing, and continuing said transfer via a central channel in the nozzle tip which extends from the longitudinal flow channel, and causing a swirling action in the annular channel by transferring molten resin from the angular channels to the annular channel to flush out resin from the annular channel.

2. The method according to claim 1, including the step of transferring molten resin via 6–8 of said angular channels circumferentially spaced around said nozzle, each of which extends in said first and second directions.

3. The method according to claim 1, including holding the tip portion in place with a nozzle cap.

4. The method according to claim 1, including transferring said molten resin from said central channel to said angular channels and also to a downstream central channel, which in turn extends to said passageway which is an annular passageway.

5. The method according to claim 4, including transferring said molten resin from said downstream central channel to said annular passageway via a plurality of angular passageways.

6. The method according to claim 1, including providing a cooled mold plate adjacent the nozzle tip and heating means adjacent the nozzle housing, including the steps of reducing mold plate cooling and increasing nozzle temperature prior to a resin change.

7. The method according to claim 1, wherein said first acute angle is from 10–30°, and said second acute angle is from 10–30°.

8. An injection nozzle, which comprises:

a nozzle including a nozzle body or housing portion communicating with a source of molten resin and a tip portion, and including an injection orifice, for transferring molten resin to a mold cavity;

wherein said nozzle has a longitudinal axis and at least one internal flow channel for transferring molten resin from said source of molten resin to said mold cavity;

said internal flow channel including:

a longitudinal flow channel, a plurality of angular channels each of which extending from the longitudinal flow channel (1) in a first direction at a first acute angle with respect to said longitudinal axis, and (2) in a second direction at a second acute angle with respect to the first direction, an annular channel extending from the angular channels, and a passageway extending from the annular channel to the injection orifice;

wherein said longitudinal flow channel extends in the nozzle housing and continues as a central channel in the nozzle tip and said angular channels cause a swirling action in said annular channel to flush out resin from said annular channel.

9. An injection nozzle according to claim 8, including 6–8 of said angular channels circumferentially spaced around said nozzle, each of which extends in said first and second directions.

10. An injection nozzle according to claim 8, wherein said internal flow channel includes a central flow channel along said longitudinal axis.

11. An injection nozzle according to claim 8, wherein said nozzle body portion has an upstream end and a downstream end, with said tip portion comprising a tip insert, said tip insert extending from the downstream end of the nozzle body to the injection orifice.

12. An injection nozzle according to claim 11, including a nozzle cap engaging the tip insert.

13. An injection nozzle according to claim 12, wherein said tip insert includes a tip insert head, wherein said tip insert head is held between the nozzle cap and the downstream end of the nozzle body portion.

14. An injection nozzle according to claim 12, including a mold plate adjacent the injection orifice, wherein said nozzle cap engages the mold plate.

15. An injection nozzle according to claim 8, wherein the collective cross-sections of said angular channels are at least equal to the cross-section of said longitudinal flow channel.

16. An injection nozzle according to claim 8, wherein said passageway is an annular passageway.

17. An injection nozzle according to claim 8, wherein the central channel extends to said angular channels and also to a downstream central channel, which in turn extends to said passageway which is an annular passageway.

18. An injection nozzle according to claim 17, wherein the downstream central channel extends to a plurality of angular channels, which in turn extend to said annular passageway.

19. An injection nozzle according to claim 8, including a mold plate adjacent the nozzle tip with cooling means in the mold plate, and heating means adjacent the nozzle housing, wherein said cooling and heating means are operative to reduce mold plate cooling and increase nozzle temperature prior to a resin change.

20. An injection nozzle according to claim 8, wherein said first acute angle is from 10–30°, and said second acute angle is from 10–30°.

* * * * *